(12) United States Patent
Martignon

(10) Patent No.: US 6,675,566 B2
(45) Date of Patent: Jan. 13, 2004

(54) TOOL, SUCH AS A LAWNMOWER OR THE LIKE, PARTICULARLY FOR GARDENING VEHICLES

(75) Inventor: Girolamo Martignon, Borgoricco (IT)

(73) Assignee: Antonio Carraro S.p.A., Campodarsego (IT)

( * ) Notice: Subject to any disclaimer, the term of this patent is extended or adjusted under 35 U.S.C. 154(b) by 0 days.

(21) Appl. No.: 10/201,976

(22) Filed: Jul. 25, 2002

(65) Prior Publication Data

US 2003/0024222 A1 Feb. 6, 2003

(30) Foreign Application Priority Data

Aug. 3, 2001 (IT) .................................. PD2001U0069

(51) Int. Cl.[7] .......................... A01D 87/10; A01D 67/00
(52) U.S. Cl. ...................................... 56/13.3; 56/320.1
(58) Field of Search .......................... 56/6, 12.8, 13.3, 56/202, 320.1

(56) References Cited

U.S. PATENT DOCUMENTS

| 4,395,865 A | * | 8/1983 | Davis et al. ................. 56/13.3 |
| 4,693,063 A | * | 9/1987 | Hoepfner et al. ............. 56/16.6 |
| 4,899,525 A | * | 2/1990 | Takei et al. .................... 56/202 |
| 5,035,108 A | | 7/1991 | Meyer et al. |
| 5,224,327 A | * | 7/1993 | Minoura et al. ............. 56/13.3 |
| 5,873,224 A | * | 2/1999 | Murakawa et al. .......... 56/11.4 |
| 6,012,273 A | * | 1/2000 | Ogasawara et al. .......... 56/16.6 |
| 6,073,430 A | * | 6/2000 | Mullet et al. ................. 56/13.4 |

FOREIGN PATENT DOCUMENTS

| FR | 2 593 349 | 7/1987 |
| FR | 2 643 213 | 8/1990 |

* cited by examiner

Primary Examiner—Robert E. Pezzuto
Assistant Examiner—Alicia Torres
(74) Attorney, Agent, or Firm—Guido Modiano; Albert Josif; Daniel O'Byrne

(57) ABSTRACT

A tool such as a lawnmower, particularly for gardening vehicles, of the type that comprises a protective housing, suitable to provide a supporting chassis for front wheels and cutting blades arranged substantially within its dimensions of the chassis, the housing being provided, in an upper region and at the front of the central region, with two mutually adjacent blades and with an opening on which there is a fan/aspirator from which a connection for a discharge duct to be connected to a collection container branches out.

2 Claims, 3 Drawing Sheets

TOOL, SUCH AS A LAWNMOWER OR THE LIKE, PARTICULARLY FOR GARDENING VEHICLES

BACKGROUND OF THE INVENTION

The present invention relates to a tool, such as a lawnmower or the like, particularly for gardening vehicles.

In the field of the tending and maintenance of gardens, vehicles are known which interchangeably support, at the front, tools that are suitable for various kinds of operations to be performed.

Lawnmower tools are constituted by a protective housing, which acts as a chassis, supports substantially horizontal cutting blades, and is provided with wheels for advancing on the ground.

Simultaneously with the cutting operations, this type of tool usually also aspirates the cut grass and/or any dry leaves by using aspirator means associated with the protective housing.

The aspirator means can be of two kinds.

The first kind, normally related to vehicles used exclusively as lawnmowers, comprises a tube that ends at the housing that protects the cutting blades and supports an aspirator along a portion of its length.

This type of aspirator means is not particularly reliable, especially with reference to manufacturing problems, load losses, and particularly difficult maintenance, especially regarding the aspirator itself, which is arranged in a position that is difficult for the user to reach.

Another type of aspirator means normally used in tools to be applied to multipurpose gardening vehicles comprises an aspirator that is arranged laterally with respect to the blade protection housing and is connected by means of a discharge duct to a collection container supported by said vehicle.

This type of aspirator means also is not free from drawbacks.

The aspirator in fact protrudes laterally from the dimensions of the protective housing, entailing in addition to limited maneuverability a total width of the tool that is greater than the actual cutting width.

In this manner, for example, the tool can cut flush to a wall only on one side.

Moreover, the position of the intake is not particularly ideal, since it is not located symmetrically with respect to the motion of the material to be aspirated, thus detracting from the efficiency of said aspiration.

SUMMARY OF THE INVENTION

The aim of the present invention is to provide a tool such as a lawnmower or the like particularly for gardening vehicles that solves or reduces substantially the problems of known kinds of tool, with particular reference to the means for aspirating the cut material.

Within this aim, an object of the invention is to provide a tool such as a lawnmower or the like that is constructively simple.

Another object is to provide a tool that is reliable.

Another object is to provide a tool whose maintenance can be performed easily and in a reduced time.

Another object is to provide a tool whose transverse dimensions are limited to those of the protective housing.

Another object is to provide a tool that ensures effective aspiration of the cut material.

Another object is to provide a tool that has a low cost and can be manufactured with conventional equipment and technology.

This aim and these and other objects that will become better apparent hereinafter are achieved by a tool such as a lawnmower, particularly for gardening vehicles, of the type that comprises a protective housing, suitable to provide a supporting chassis for front wheels and cutting blades arranged substantially within dimensions of the chassis, characterized in that said housing is provided, in an upper region and at the front of a central region, with two mutually adjacent blades and with an opening on which there is a fan/aspirator from which a connection for a discharge duct to be connected to a collection container branches out.

BRIEF DESCRIPTION OF THE DRAWINGS

Further characteristics and advantages of the present invention will become better apparent from the following detailed description of a preferred but not exclusive embodiment thereof, illustrated only by way of non-limitative example in the accompanying drawings, wherein.

DESCRIPTION OF THE PREFERRED EMBODIMENTS

Figure 1:
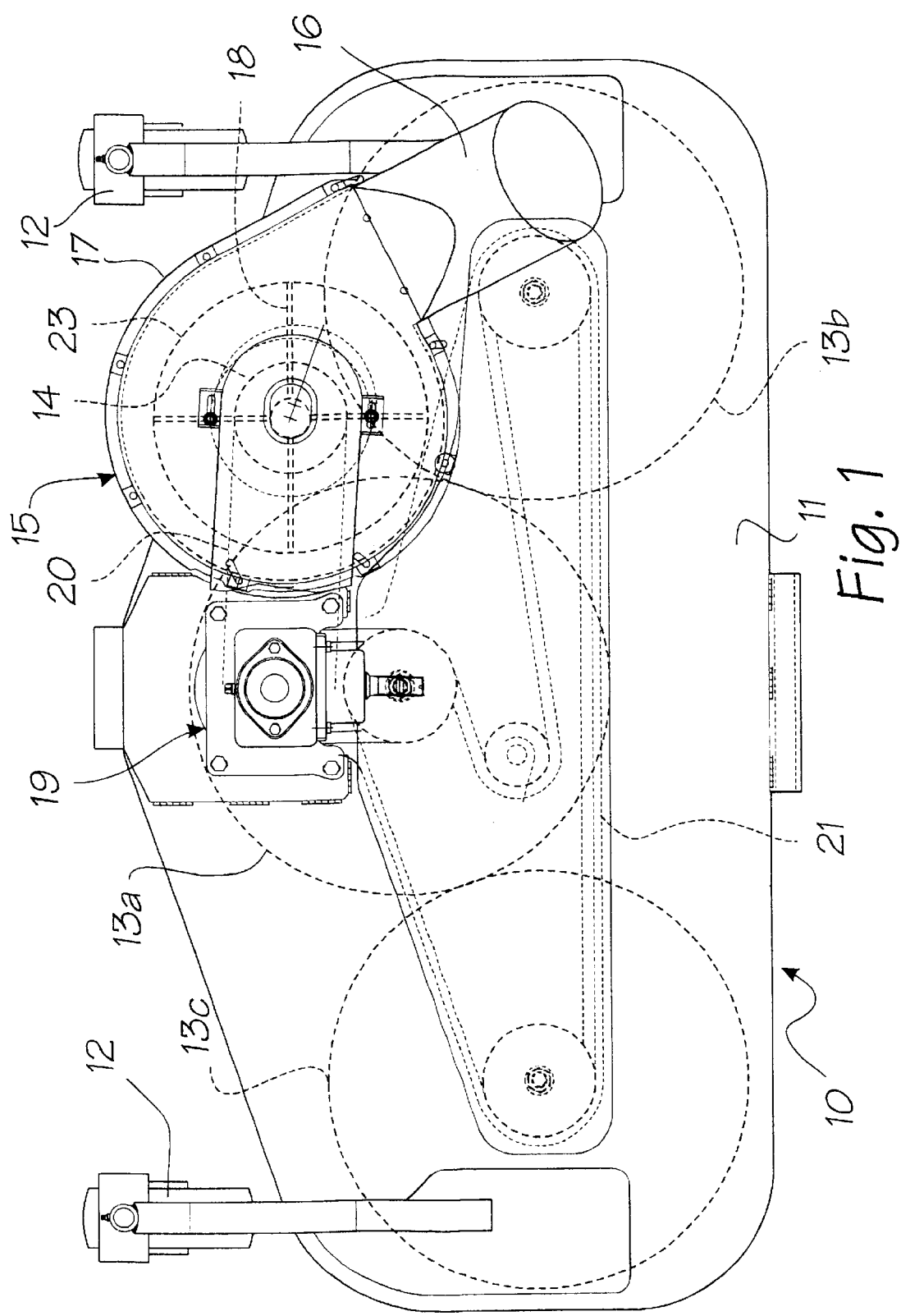
FIG. 1 is a plan view of a tool such as a lawnmower, having the structure according to the invention.
Figure 2:
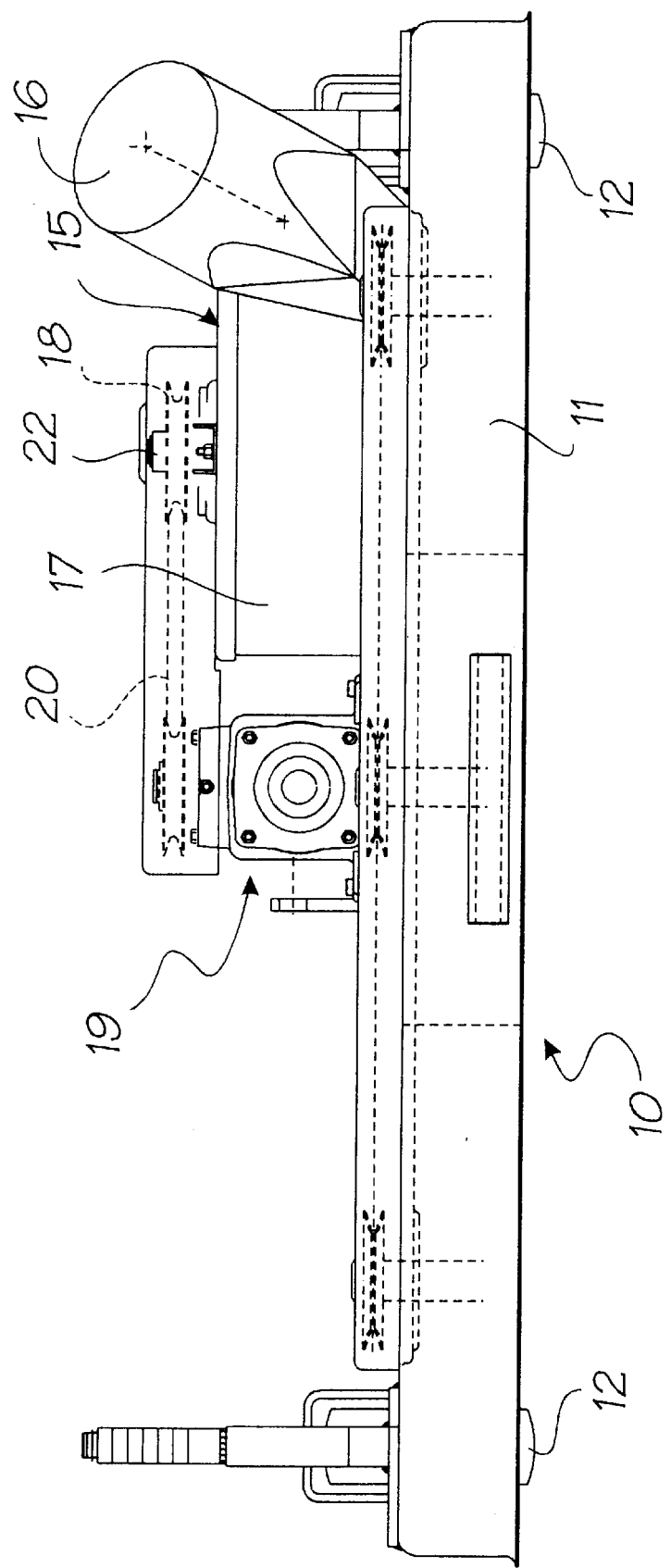
FIG. 2 is a rear view of the tool of FIG. 1.
Figure 3:
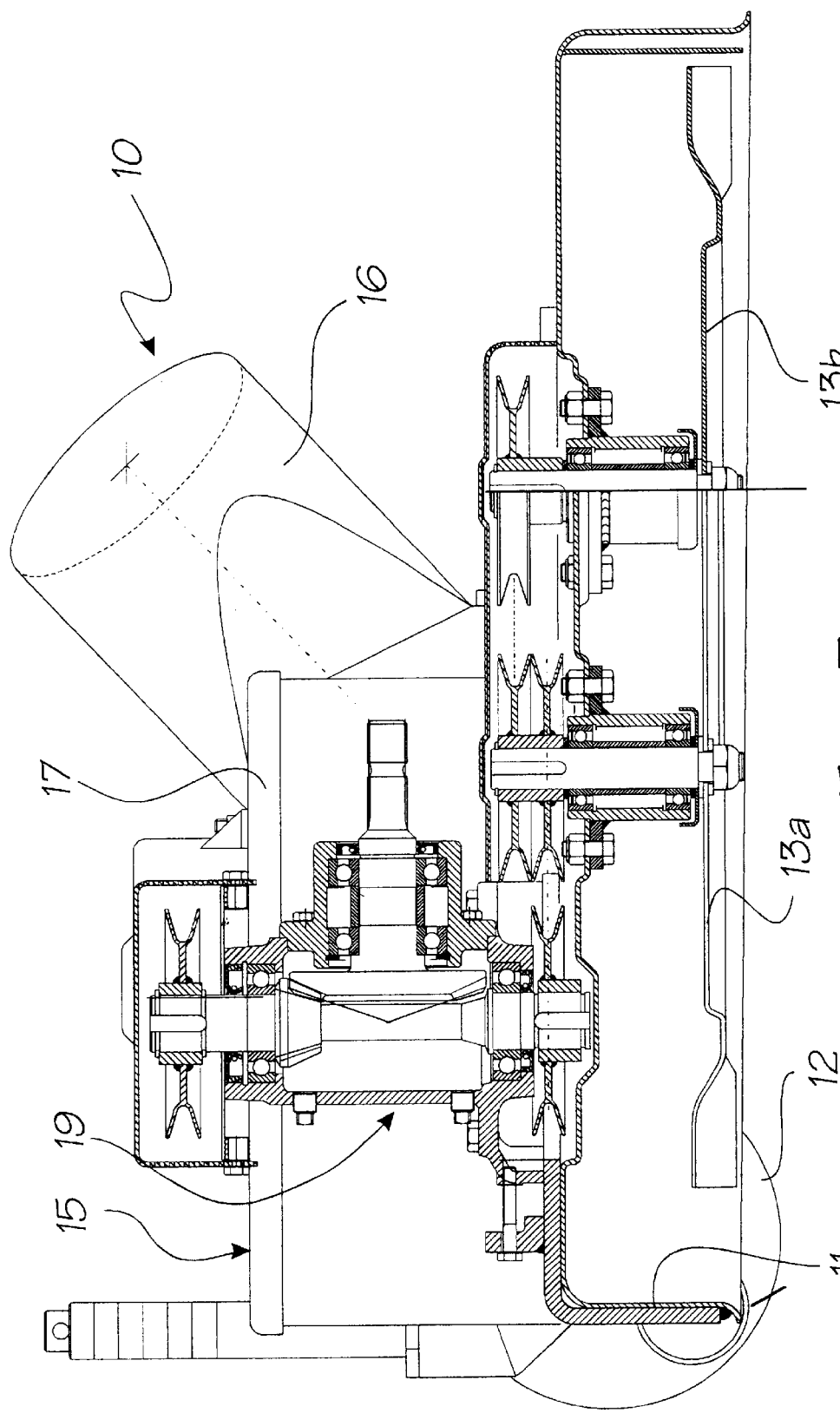
FIG. 3 is a sectional side view of the tool of FIGS. 1 and 2.

With reference to the figures, a tool such as a lawnmower or the like particularly for gardening vehicles having the structure according to the invention is generally designated by the reference numeral 10.

The tool 10 comprises a protective housing 11, which also acts as a chassis, is provided at the front with wheels 12 for advancing on the ground, and supports in a lower region, within its own dimensions, cutting blades described in greater detail hereinafter and arranged substantially horizontally.

In particular, the tool 10 is provided with three cutting blades, one of which is central and designated by the reference numeral 13a and lies ahead of the two lateral ones 13b and 13c, which are aligned.

The housing 11 monolithically supports in an upper region, at the front, at an opening 14 of the housing, a fan/aspirator, generally designated by the reference numeral 15, from which a connection 16 protrudes that is designed to be connected to a duct for discharge toward a collection container supported by the vehicle to which the tool 10 is applied, all of the above not being shown in the figure.

The opening 14 is arranged above the housing 11, adjacent to the central region between the central blade 13a and the lateral blade 13b.

Above the opening 14 there is a frame 17 of the fan/aspirator 15, which supports a suction impeller 23 so that it is rotatably coupled.

The impeller of the fan/aspirator 15 is arranged on a shaft 22 to which a pulley 18 is keyed; the pulley is connected, by means of a first belt drive 20, to a power take-off 19 to be connected to a corresponding power take-off that draws from the engine of the gardening vehicle and also turns the cutting blades 13a, 13b and 13c, which are kinematically connected to it by means of a second belt drive 21.

With regard to operation, it is thus evident that once the tool 10 has been connected to a gardening vehicle, the cutting blades 13a, 13b and 13c and the impeller of the fan/aspirator 15 are turned under the actuation of the power take-off 19, which is to be connected kinematically to the gardening vehicle.

The arrangement of the fan/aspirator 15 is such that the material cut and shredded by the cutting blades 13a, 13b and 13c is aspirated by the fan/aspirator 15 and, by passing through the discharge duct 16, is deposited in a collection container.

The arrangement of the opening 14 is particularly advantageous, since it is closest to all three blades, optimizing the suction operation.

Furthermore, the fan/aspirator 15 can be reached easily for all the necessary maintenance operations and is further arranged in a position whereby the load losses are minimized.

The dimensions of the fan/aspirator 15 does not interfere with the transverse dimensions of the housing 11 and therefore does not compromise the actual cutting width and the overall maneuverability of the tool 10.

All the technical details may further be replaced with other technically equivalent elements.

The materials, so long as they are compatible with the contingent use, as well as the dimensions, may be any according to requirements.

The disclosures in Italian Utility Model Application No. PD2001U000069 from which this application claims priority are incorporated herein by reference.

What is claimed is:

1. A lawnmower tool, particularly for gardening vehicles, of the type that comprises a protective housing, suitable to provide a supporting chassis for front wheels and cutting blades arranged substantially within dimensions of the chassis, wherein said housing is provided, in an upper region and at the front of the central region, with two mutually adjacent blades and with an opening on which there is a fan/aspirator from which a connection for a discharge duct to be connected to a collection container branches out, said housing supporting three cutting blades, one of which is central and arranged ahead of the two lateral aligned blades, said opening being arranged above and ahead of the central region that lies between said central blade and a lateral blade, the impeller of said fan/aspirator being kinematically connected to a power take-off, which is arranged above said housing and is designed to be connected to a corresponding power take-off that branches out from the engine of the gardening vehicle to which said tool is applied, said power take-off being in turn kinematically connected to said cutting blades, said power take-off having an upper shaft portion to which an upper pulley is connected, and said power take-off having a lower shaft portion to which a lower pulley is connected, said impeller of the fan/aspirator being arranged on a shaft that is rotatably coupled to said frame and on which a pulley is keyed, said pulley being connected by means of a first belt drive directly to said upper pulley of said power take-off, which also rotates said cutting blades, which are kinematically connected directly to said lower pulley of said power take-off by means of a second belt drive.

2. A lawnmower tool, particularly for gardening vehicles, of the type that comprises a protective housing, suitable to provide a supporting chassis for front wheels and cutting blades arranged substantially within dimensions of the chassis, wherein said housing is provided, in an upper region and at the front of the central region, with two mutually adjacent blades and with an opening on which there is a fan/aspirator from which a connection for a discharge duct to be connected to a collection container branches out, above said opening and monolithically with respect to the housing there being provided a frame of said fan/aspirator, which supports a rotatably coupled impeller and from which said discharge duct branches out, the impeller of said fan/aspirator being kinematically connected to a power take-off, which is arranged above said housing and is designed to be connected to a corresponding power take-off that branches out from the engine of the gardening vehicle to which said tool is applied, said power take-off being in turn kinematically connected to said cutting blades, said power take-off having an upper shaft portion to which an upper pulley is connected, and said power take-off having a lower shaft portion to which a lower pulley is connected, said impeller of the fan/aspirator being arranged on a shaft that is rotatably coupled to said frame and on which a pulley is keyed, said pulley being connected by means of a first belt drive directly to said upper pulley of said power take-off, which also rotates said cutting blades, which are kinematically connected directly to said lower pulley of said power take-off by means of a second belt drive.

* * * * *